United States Patent
Baum et al.

(10) Patent No.: US 9,553,941 B2
(45) Date of Patent: Jan. 24, 2017

(54) ENABLING PROXIMITY OPERATIONS WITH LONG-RANGE WIRELESS COMMUNICATION INTERFACES

(71) Applicant: Texas Instruments Incorporated, Dallas, TX (US)

(72) Inventors: Avi Baum, Giva't Shmuel (IL); Eli Dekel, Tzur Igal (IL); Yaniv Tzoreff, Shoham (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 49 days.

(21) Appl. No.: 14/486,660

(22) Filed: Sep. 15, 2014

(65) Prior Publication Data

US 2016/0080511 A1    Mar. 17, 2016

(51) Int. Cl.
| | |
|---|---|
| *H04L 29/08* | (2006.01) |
| *H04W 64/00* | (2009.01) |
| *H04B 17/318* | (2015.01) |
| *H04W 84/12* | (2009.01) |

(52) U.S. Cl.
CPC ............ *H04L 67/24* (2013.01); *H04B 17/318* (2015.01); *H04L 67/34* (2013.01); *H04W 64/003* (2013.01); *H04W 84/12* (2013.01)

(58) Field of Classification Search
USPC ........................................................ 370/338
See application file for complete search history.

(56) References Cited

U.S. PATENT DOCUMENTS

| | | | |
|---|---|---|---|
| 5,220,678 A * | 6/1993 | Feei ....................... | H04W 52/50 455/127.1 |
| 8,953,720 B1 * | 2/2015 | Palanivelu .......... | H04L 27/0012 375/340 |
| 2002/0003481 A1 | 1/2002 | Kantola et al. | |
| 2006/0239291 A1 * | 10/2006 | Birchler ................. | H04L 45/00 370/437 |
| 2010/0278345 A1 * | 11/2010 | Alsina ................. | H04L 63/0492 380/283 |
| 2010/0323717 A1 | 12/2010 | Agashe et al. | |
| 2011/0092289 A1 * | 4/2011 | Dagman ................. | A63F 13/10 463/37 |
| 2013/0005277 A1 * | 1/2013 | Klomsdorf ............. | H01Q 21/30 455/77 |
| 2013/0039212 A1 | 2/2013 | Li et al. | |
| 2013/0169434 A1 * | 7/2013 | McCown ............... | G08B 21/00 340/540 |
| 2013/0309969 A1 | 11/2013 | Armstrong et al. | |
| 2014/0334388 A1 * | 11/2014 | Novak ............. | H04W 72/1263 370/329 |

* cited by examiner

*Primary Examiner* — Mohammad Anwar
*Assistant Examiner* — Kokou R Detse
(74) *Attorney, Agent, or Firm* — Ronald O. Neerings; Charles A. Brill; Frank D. Cimino (57) ABSTRACT

Systems and methods for enabling proximity operations with long-range wireless communication interfaces are described. In an illustrative, non-limiting embodiment, a method may include transmitting a plurality of data packets using a WiFi interface of a first device, where each data packet has a signal strength following a predetermined pattern; and receiving an indication, via the WiFi interface, of whether the predetermined pattern has been identified by a second device.

19 Claims, 4 Drawing Sheets

FIG. 6

ENABLING PROXIMITY OPERATIONS WITH LONG-RANGE WIRELESS COMMUNICATION INTERFACES

TECHNICAL FIELD

This specification is directed, in general, to wireless communications, and, more specifically, to systems and methods for enabling proximity operations with long-range wireless communication interfaces.

BACKGROUND

The following discussion sets forth the inventor's own knowledge of certain technologies and/or problems associated therewith. Accordingly, this discussion is not an admission of prior art, and it is not an admission of the knowledge available to a person of ordinary skill in the art.

The need for positive presence validation is quite a common task in a large variety of use cases that involve wireless communications. It is primarily a result of the fact that typically when a wireless medium is involved, peer devices can be physically located elsewhere (theoretically, anywhere in the network). There are use cases in which co-location of the parties is important and cannot be avoided. In these cases, mechanisms for ensuring device co-location are necessary. The various use cases may be clustered into several domains, including, but not limited to: (a) registration during authentication, (b) peer validation or verification, and (c) personalization or customization.

Registration during authentication ensures that the party involved in a registration or authentication procedure is indeed physically located in the close vicinity of one another and therefore may be trusted. An example of registration during authentication includes the initial pairing with an access point (AP) or with another peer (P2P) device. Peer validation or verification is another mechanism for presence detection. For instance, peer validation may be used for admission control, allowing only users at certain physical distance to gain access (e.g., a café hotspot that limits access to a certain range, rather than the full WiFi range). Personalization or customization involves the use of dynamically enabled services. For example, dynamically personalized data may be presented by a system if the system knows that the data is being observed by a relevant peer (e.g., a vending machine or other electronic terminal displays preferences or payment options specific to a nearby user).

Conventionally, proximity has been determined by causing a user to physically press a button on the peer device thereby proving physical access to it, or by asking that the user type a personal identification number (PIN) code or the like presented by the peer device as way of proving it is actually being observed by the user. Nowadays, proximity may also be determined using dedicated wireless communication technologies—e.g., Near Field Communications (NFC) or Radio Frequency Identification (RFID)—that are entirely distinct from the main wireless communication technology (e.g., WiFi, WiMAX, etc.).

SUMMARY

Systems and methods for enabling proximity operations with long-range wireless communication interfaces are described. In an illustrative, non-limiting embodiment, a method may include transmitting a plurality of data packets using a WiFi interface of a first device, where each data packet has a signal strength following a predetermined pattern; and receiving an indication, via the WiFi interface, of whether the predetermined pattern has been identified by a second device.

For example, the first device may include a WiFi access point and the second device may include a mobile device. The WiFi interface may include an impedance matching circuit coupled to an antenna. Transmitting the plurality of data packets further may include purposefully deteriorating the signal strength of one or more of the plurality of data packets according to the predetermined pattern. The predetermined pattern may be configured to emulate a physical movement of the second device with respect to the first device. For instance, in some cases the physical movement may include a swiping motion of the second device with respect to the first device.

The second device may be configured to identify the pattern by comparing the relative signal strength of received data packets with an expected pattern. Moreover, one or more of the plurality of data packets may include configuration data in a payload portion usable by the second device to perform configuration operation.

In another illustrative non-limiting embodiment, a method may include configuring an impedance matching circuit of a WiFi interface to provide a first amount of signal degradation; transmitting a first packet via the WiFi interface; configuring the impedance matching circuit of the WiFi interface to provide a second amount of signal degradation different from the first amount of degradation; transmitting a second packet via the WiFi interface, where a difference between the first and second amounts of signal degradation is identifiable by another electronic device in communication with the electronic device during a proximity operation; and receiving an indication from the other electronic device of whether the difference between the first and second amounts of signal degradation is proportional to an expected difference.

In some cases, the proximity operation may include a pairing operation, a validation operation, or a personalization operation. The method may also include configuring the impedance matching circuit of the WiFi interface to provide a third amount of signal degradation; transmitting a third packet via the WiFi interface, where a difference between the second and third amounts of signal degradation is identifiable by the other electronic device during the proximity operation; and receiving an indication from the other electronic device of whether the difference between the third and second amounts of signal degradation is proportional to another expected difference.

In yet another embodiment, another method may include receiving a plurality of data packets via a wireless communication interface, where each data packet has a radio frequency (RF) signal power that follows a time-varying pattern; and transmitting an indication, via the wireless communication interface as part of a proximity operation, of whether the time-varying pattern matches a predetermined pattern.

In some embodiments, one or more communications devices or computer systems may perform one or more of the techniques described herein. In other embodiments, a tangible computer-readable or electronic storage medium may have program instructions stored thereon that, upon execution by one or more communications devices or computer systems, cause the one or more communications devices or computer systems to execute one or more operations disclosed herein. In yet other embodiments, a communications system or device may include at least one processor and a memory coupled to the at least one processor.

Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Having thus described the invention(s) in general terms, reference will now be made to the accompanying drawings, where:

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, systems and methods described herein enable one or more proximity operations—which would otherwise require the implementation of dedicated, short-range wireless communications (e.g., Near Field Communications, Radio Frequency Identification, low-power Bluetooth, etc.)—to be instead performed over a long-range wireless communications (e.g., WiFi, WiMAX, etc.). In some cases, a given device may determine whether another device is physically close to it using a long-range wireless communication interface. Examples of operations that may be triggered in response to a proximity determination include, but are not limited to, pairing, validation, and personalization.

In some embodiments, a combination of hardware and software may enable the proximity experience based on an already available long-range wireless communication medium, thus making the experience inherent and self-contained without a need to involve a separate, short-range alternative channel (e.g., NFC). This in turn provides a low-cost, seamless proximity-based alternative to dedicated near communication channels. In some cases, hardware changes may be applied at the reference design level without requiring internal change to the silicon. Moreover, hardware changes may be implemented on one device, and therefore does not imply that both terminals be altered to support these capabilities. This facilitates the introduction of devices into already deployed networks without massive deployment implications, thereby increasing its viability.

At a high level, the systems and methods described herein involve, from a hardware perspective, manipulation of a radio frequency (RF) signal path that has a controllable matching circuitry (or anti-matching), such that it can purposefully decay or degrade the RF signal to low power levels. From a software standpoint, an access point or other network device may be configured to control the matching circuitry. This provides the ability to artificially control the perceived range by peer devices through transmitted signal strength.

In an embodiment, a stream of packets sent by a communication device (e.g., an access point or the like) may follow the standard WiFi exchange protocol. However one or more packets may be arbitrarily sent through the proximity terminal of the device; that is, the device's RF path for short-range communications. As a result, only peers with close proximity are able to receive those packets and interact with the communication device. As a further optimization, the communication device may also choose to conduct the scanning using the proximity terminal.

In another embodiment, the packet stream sent may include specific content so that it may be detected by the peer device based on its content (e.g., using the type, subtype and source address in the 802.11 MAC header fields; or alternatively with a specific information element attached to the packet). In some cases, packets of management type (00), with reserved subtype (0111) may be used because of to their short nature and the ability to exchange them prior to connection.

Figure 1:
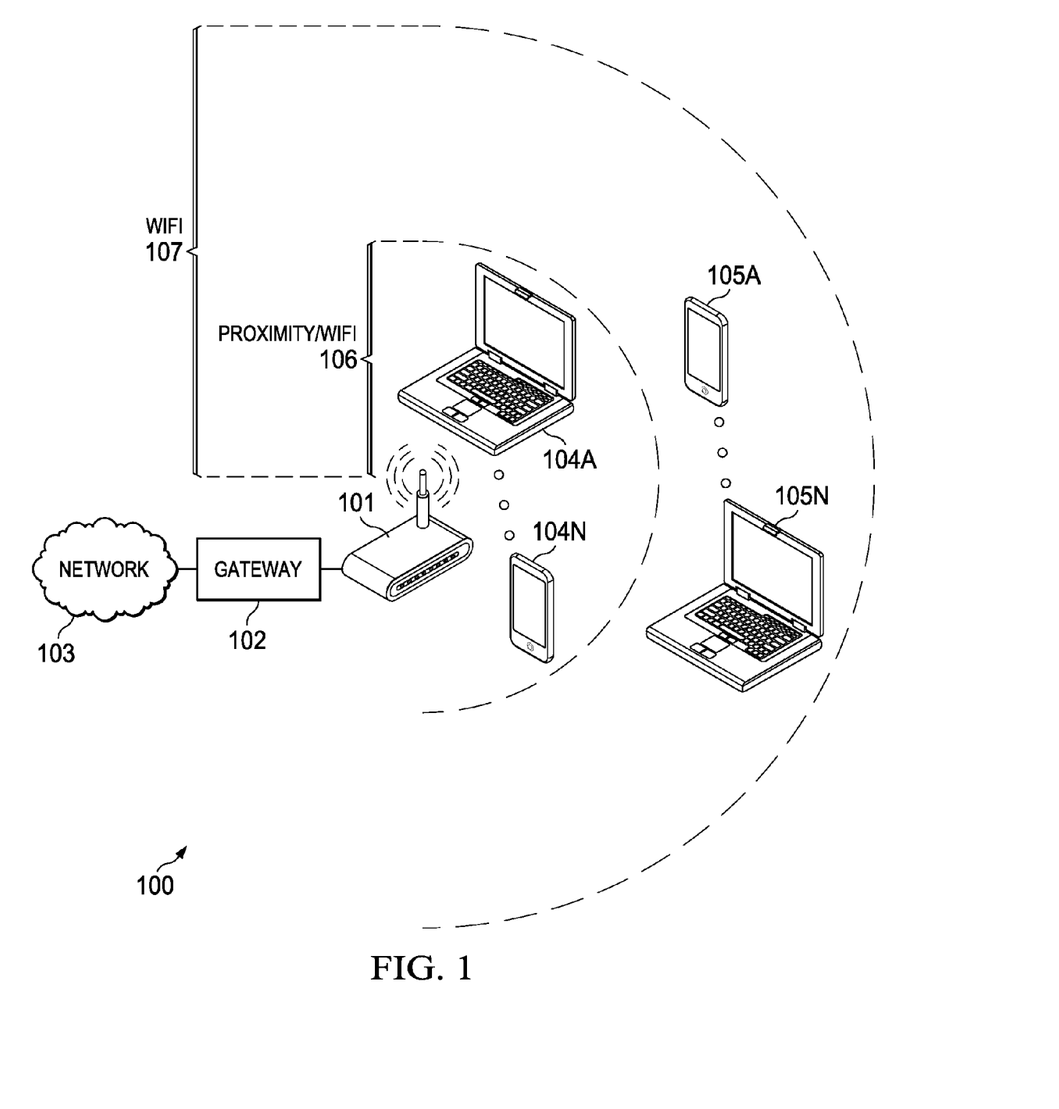
FIG. 1 is a block diagram of an example of an environment where systems and methods for enabling proximity operations with long-range wireless interfaces may be implemented according to some embodiments.

To better illustrate the foregoing, FIG. 1 is a block diagram of an example of environment 100 where systems and methods for enabling proximity operations with long-range wireless interfaces may be implemented, according to some embodiments. In this example, wireless access point 101 is coupled to gateway 102, which in turn is coupled to network 103 (e.g., the Internet). Wireless access point 101 is configured to provide devices 104A-N and 105A-N (e.g., mobile communication devices, cellular phones, tablets, laptop computers, desktop computers, smart appliances, etc.) with access to network 103 via a long-range communication interface.

For ease of explanation, several examples described herein refer to the long-range wireless communication interface as "WiFi," which is also known as the IEEE 802.11 standard. More generally, however, it should be noted, that the same principles described herein may apply to any other suitable long-range communication standards, now existing or yet to be developed. To illustrate the distinction between "long-range" and "short-range," consider that communication range 107 of a WiFi interface is of the order of ~10 m to ~100 m when environment 100 is indoors, and may vary between ~100 m to ~500 m when environment 100 is outdoors. This is in contrast with short-range wireless communication technologies such as NFC, for example, which typically has proximity range 106 of less than ~0.2 m.

In some embodiments, in order to implement systems and methods described herein, neither hardware nor software changes are required on devices 104A-N or 105A-N ("peer devices" or "peer terminals"). These systems and methods may therefore be used with any existing peer device, for example, for simple and easy pairing between access point 101 and device 104N. Additionally or alternatively, software changes may be made to the peer device to provide additional level of security as well the possibility for out-of-band data exchange channel.

Figure 2:
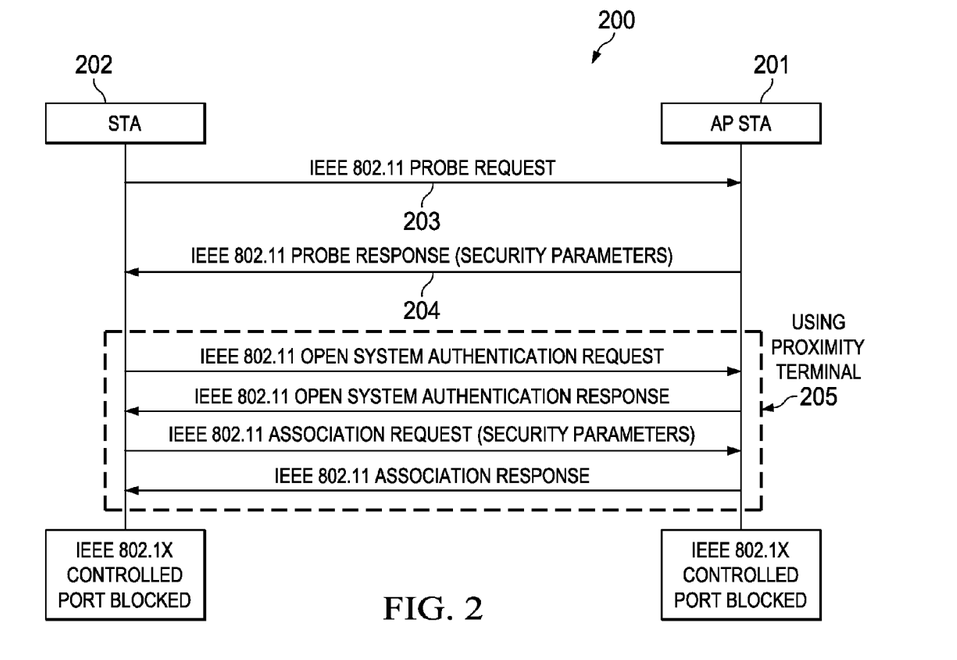
FIG. 2 is a message diagram of an example of a wireless connection exchange sequence usable to implement systems and methods for proximity WiFi according to some embodiments.

FIG. 2 is a message diagram of an example of a wireless connection exchange sequence usable to implement systems and methods for proximity WiFi according to some embodiments. In this example, access point station AP STA 201 (e.g., access point 101 in FIG. 1) receives an IEEE 802.11 "PROBE REQUEST" message 203 from station STA 202 (e.g., device 104N in FIG. 1). In response to message 203, AP STA 201 then sends an IEEE 802.11 "PROBE RESPONSE" message 204 to STA 202. Moreover, messages 203 and 204 are received and transmitted by AP STA 201, respectively, over its WiFi interface—that is, using its WiFi antenna and corresponding RF circuitry.

Messages 205, on the other hand, may be received and transmitted by AP STA 201 over its short-range wireless communication interface or proximity terminal—for instance, using an NFC antenna and associated RF circuitry. Examples of messages 205 may include an "OPEN SYSTEM AUTHENTICATION REQUEST" message transmitted by STA 202 to AP STA 201, an "OPEN SYSTEM AUTHENTICATION RESPONSE" message transmitted by AP STA 201 to STA 202, an "ASSOCIATION REQUEST" message transmitted by STA 202 to AP STA 201, and an "ASSOCIATION RESPONSE" message transmitted by AP STA 201 to STA 202. During the exchange of messages 205, the WiFi port may be blocked in AP STA 201 and/or STA 202.

Accordingly, the embodiment of FIG. 2 allows STA 202 to participate in a proximity transaction with AP STA 201 by redirecting at least a portion of a WiFi message exchange through a short-range RF circuit. In alternative embodiments, however, a short-range RF circuit may not be available or may not be necessary, as described in more detail below.

Figure 3:
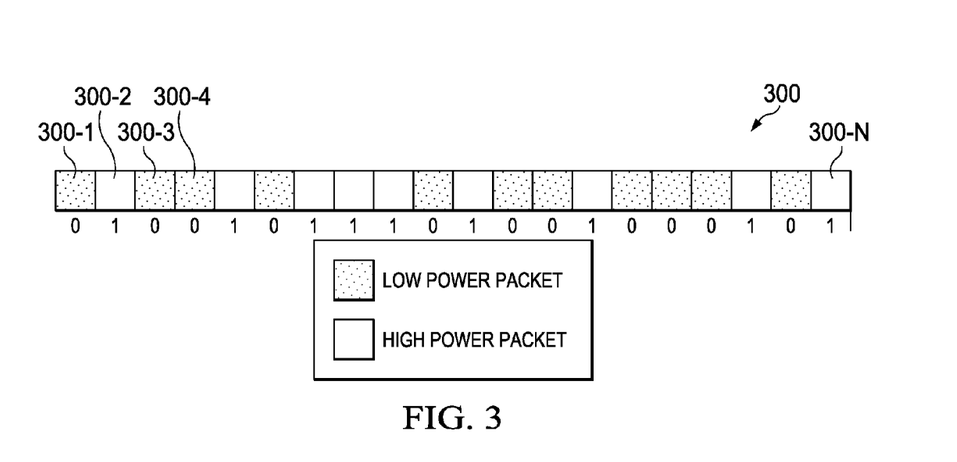
FIG. 3 is a block diagram of an example of a sequence of data packets usable to implement systems and methods for proximity WiFi according to some embodiments.

FIG. 3 is a block diagram of an example of sequence of data packets 300 usable to implement systems and methods for proximity WiFi according to some embodiments. In this case, the device sending stream of packets 300 (e.g., access point 101 of FIG. 1) has the ability to arbitrarily control the matching of the device RF terminal thereby allowing it to generate a transmission with a time-varying signal strength pattern on a per packet basis.

The peer device (e.g., device 104N of FIG. 1) may be configured to detect this stream based on packet type and content. While the stream is sent, the receiving station identifies and extracts the changing power pattern of packets 300-1 through 300-N, and stores that information. The identified time-varying pattern may be correlated against expected admission sequence (e.g., password), or may serve in a later phase to be cross-checked with device provided information (e.g., unique device ID). In some cases, the relative power difference between subsequently received packets may be stored, so that a comparison may be performed on a relative (rather than absolute) basis.

In some cases, two different power levels may be used (e.g., low power and high power). In other cases, however, any different number of discrete power levels may be used. The time-varying pattern may be configured to simulate a physical movement between devices. For example, in order to simulate a swiping motion, the time-varying pattern may start with a lowest power level and progressively increase that level as subsequent packets are transmitted up until a maximum or peak power value, and then the power level may be reduced back to the initial level. These power variations may be linearly, quadratically, randomly or arbitrarily implemented.

Moreover, packets that constitute the stream may carry additional data to be delivered to the peer device. This introduces an optional ability of this solution to deliver data during the initial connection phase that can be used later on for purposes such as, for example, initial configuration, advanced admission control etc.

Figure 4:
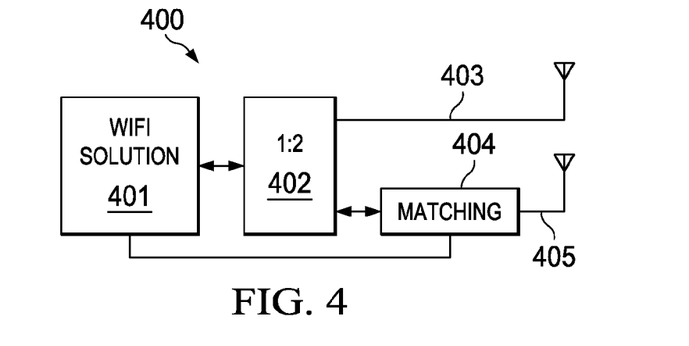
FIG. 4 is a block diagram of an example of a radio frequency (RF) circuit configured to implement systems and methods for proximity WiFi according to some embodiments.

FIG. 4 is a block diagram of an example of radio frequency (RF) circuit 400 configured to implement systems and methods for proximity WiFi according to some embodiments. As shown, WiFi solution 401 may include a digital circuit configured to implement a WiFi communication standard. Multiplexer 402 is coupled to WiFi solution 401, and is also coupled to first RF antenna 403. Matching circuit 404 is coupled to a second output of multiplexer 402 and to second antenna 405.

In some implementations, antenna 403 may be a long-range communication antenna, whereas antenna 405 may be a short-range communication antenna. In other implementations, however, a single antenna may be used and/or multiplexer 402 may be absent.

In addition to implementing conventional WiFi functionality, WiFi solution 401 may be further configured (via software and/or firmware) to control matching circuitry 404. In operation, WiFi solution 401 may send control signals to matching circuit 404 to control an impedance matching and therefore purposefully degrade or otherwise reduce the RF power of transmitted signals on a per-packet basis.

Figure 5:
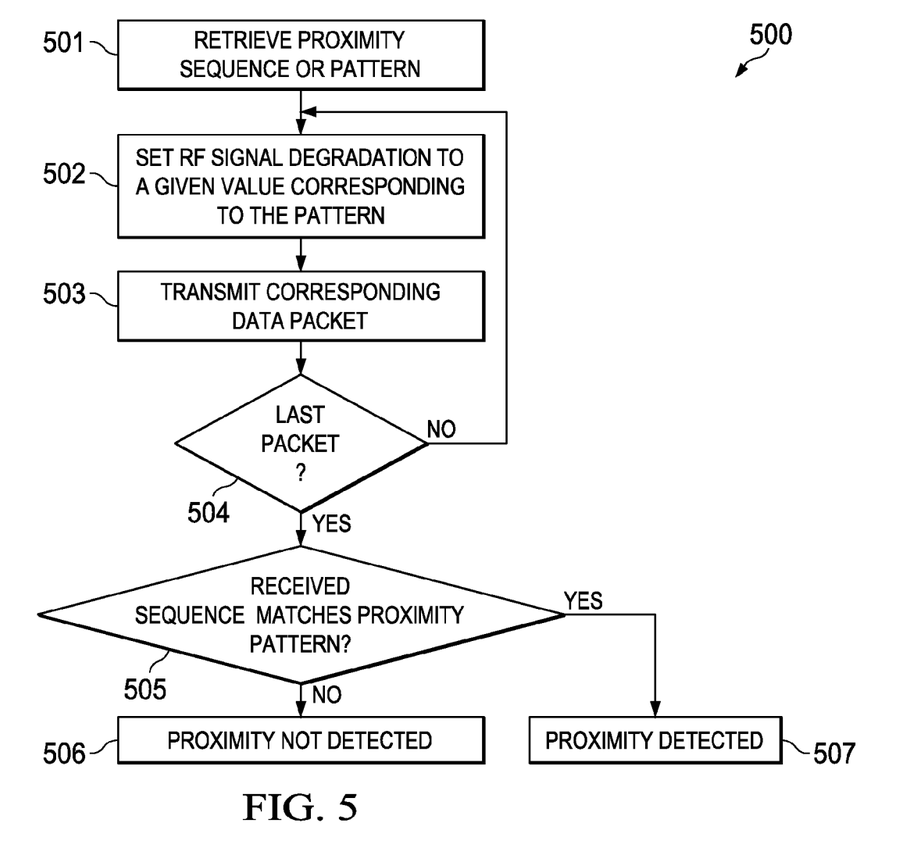
FIG. 5 is a flowchart of an example of a method for proximity WiFi according to some embodiments.

FIG. 5 is a flowchart of an example of method 500 for proximity WiFi. In some embodiments, method 500 may be implemented by access point 101 of FIG. 1 using RF circuit 400 of FIG. 4 as part of its WiFi interface. At block 501, method 500 may include retrieving (e.g., from a memory) or otherwise identifying a time-varying, proximity sequence or pattern to be used in the proximity operation. At block 502, method 500 includes configuring an impedance matching circuit of a WiFi interface to provide a first amount of signal degradation, and at block 503 method 500 includes transmitting a corresponding data packet.

At block 504, method 500 includes determining whether the transmitted data packet is the last data packet in the sequence. If not, control returns to blocks 502 and 503 where subsequent packet(s) are transmitted with a corresponding power level. When the sequence is finalized, block 505 analyzes a response has been received from the peer device indicating whether the sequence received by the peer device matches the transmitted sequence. If not, proximity is not detected at block 506. For example, device 104N of FIG. 1 may be disposed outside or beyond the reach of proximity zone 106.

If a match is detected, however, a proximity operation may be triggered at block 507. For example, a pairing operation or the like may be initiated in response to device 104N being within proximity zone 106. Also, on the peer device side, a difference between the first and second amounts of signal degradation may be identifiable prior to block 505 being executed.

Figure 6:
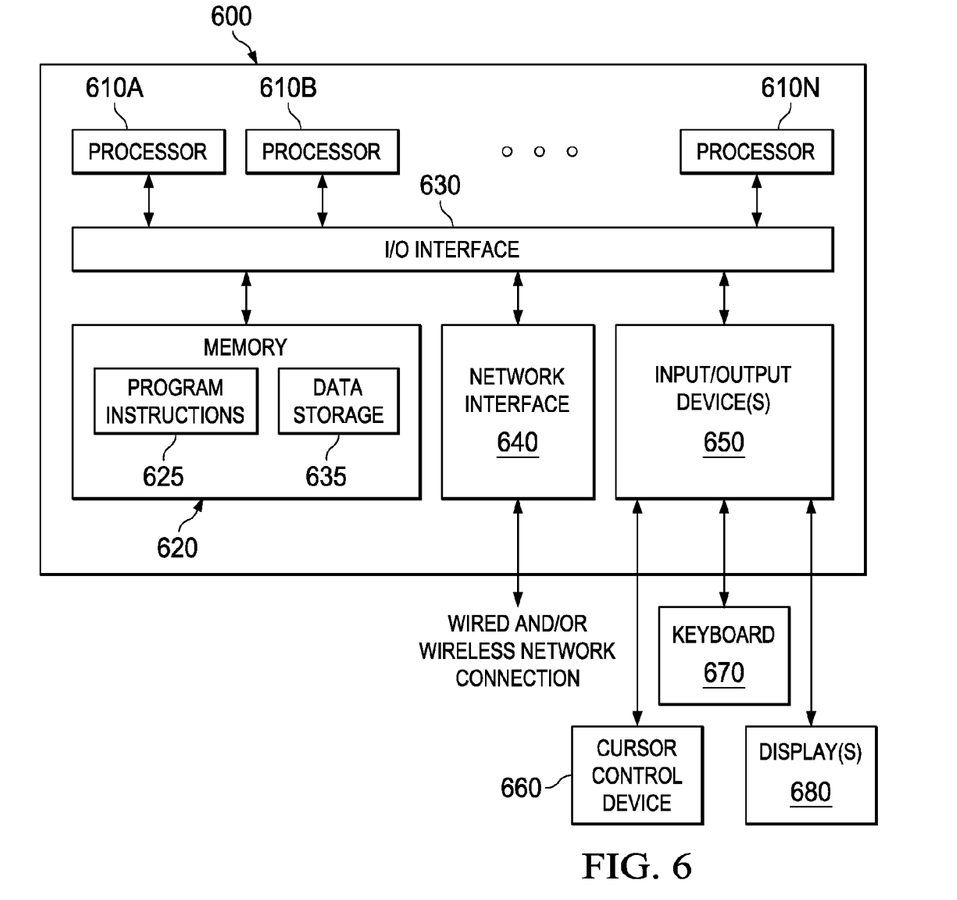
FIG. 6 is a block diagram of a computer system configured to implement systems and methods for proximity WiFi according to some embodiments.

In certain embodiments, one or more of the techniques described above may be executed, at least in part, by one or more communication devices and/or computer systems. One such computer system is illustrated in FIG. 6. In various embodiments, system 600 may be implemented as a communication device, modem, data concentrator, server, a mainframe computer system, a workstation, a network computer, a desktop computer, a laptop, mobile device, or the like (e.g., devices 101, 102, 104A-N, and/or 105A-N). In different embodiments, these various systems may be configured to communicate with each other in any suitable way, such as, for example, via a local area network or the like. It should be understood, however, that in various embodiments system 600 may be more or less complex, and may have more or fewer components, than shown in this example.

As illustrated, system 600 may include one or more processor(s) 610A-N coupled to a system memory 620 via an input/output (I/O) interface 630. System 600 may further includes a network interface 640 coupled to I/O interface 630, and one or more input/output devices 625, such as cursor control device 660, keyboard 670, display(s) 680, and/or mobile device 690. In various embodiments, system 600 may be a single-processor system including one processor 610, or a multi-processor system including two or more processors 610A-N (e.g., two, four, eight, or another suitable number). Processors 610 may be any processor capable of executing program instructions. For example, in various embodiments, processor(s) 610A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 610A-N may commonly, but not necessarily, implement the same ISA. Also, in some embodiments, at least one processor 610A-N may be a graphics processing unit (GPU) or other dedicated graphics-rendering device.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 620 as program instructions 625 and data storage 635, respectively. In other embodiments, program instructions and/or data may be received, sent or stored upon different types of computer-accessible media or on similar media separate from system memory 620 or computer system 600.

Generally speaking, a computer-accessible medium may include any tangible storage media or memory media such as magnetic or optical media—e.g., disk or CD/DVD-ROM coupled to computer system 600 via I/O interface 630. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 640.

In an embodiment, I/O interface 630 may be configured to coordinate I/O traffic between processor(s) 610A-N, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor(s) 610A-N). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor(s) 610A-N.

Network interface 640 may be configured to allow data to be exchanged between system 600 and other devices attached to a network, such as other communication or computer systems, or between nodes of system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. For example, network interface 640 may include RF interface 400 of FIG. 4, or the like.

Input/output devices 650 may, in some embodiments, include one or more display terminals, keyboards, keypads, touchpads, scanning devices, voice or optical recognition devices, mobile devices, or any other devices suitable for entering or retrieving data by one or more system 600. Multiple input/output devices 650 may be present in computer system 600 or may be distributed on various nodes of system 600. In some embodiments, similar input/output devices may be separate from system 600 and may interact with one or more nodes of system 600 through a wired or wireless connection, such as over network interface 640.

As shown in FIG. 6, memory 620 may include program instructions 625 configured to implement certain embodiments described herein (e.g., implementing one or more operations shown in FIG. 5), and data storage 635 comprising various data accessible by program instructions 625. In an embodiment, program instructions 625 may include software elements of embodiments illustrated in the above figures. For example, program instructions 625 may be implemented in various embodiments using any desired programming language, scripting language, or combination of programming languages and/or scripting languages (e.g., C, C++, C#, JAVA®, JAVASCRIPT®, PERL®, etc.). Data storage 635 may include data that may be used in these embodiments (e.g., recorded communications, profiles for different modes of operations, etc.). In other embodiments, other or different software elements and data may be included.

A person of ordinary skill in the art will appreciate that system 600 is merely illustrative and is not intended to limit the scope of the disclosure described herein. In particular, a computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. That is, the importance of the presence of other peripherals is secondary and not mandatory for successful implementation of the various embodiments. Accordingly, systems and methods described herein may be implemented or executed with other configurations.

It will be understood that various operations discussed herein may be executed simultaneously and/or sequentially.

It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, where the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method, comprising:
   identifying, by a first device, a plurality of data packets to be transmitted following a WiFi protocol;
   transmitting a first subset of the plurality of data packets using a first Radio Frequency (RF) interface of the first device as part of a communication having a first range;
   transmitting a second subset of the plurality of data packets using a second RF interface of the first device as part of a proximity operation having a second range shorter than the first range, wherein each data packet of the second subset is transmitted with a time-varying signal strength pattern on a per packet basis; and
   receiving an indication, via the WiFi interface, of whether the time-varying signal strength pattern has been identified by a second device.

2. The method of claim 1, wherein the first device includes a WiFi access point.

3. The method of claim 1, wherein the second device includes a mobile device.

4. The method of claim 1, wherein the second RF interface includes an impedance matching circuit coupled to an antenna.

5. The method of claim 1, wherein transmitting the second subset of the plurality of data packets further comprises purposefully deteriorating the signal strength of one or more data packets according to the time-varying signal strength pattern on the per packet basis.

6. The method of claim 1, wherein the time-varying signal strength pattern is configured to emulate a physical movement of the second device with respect to the first device.

7. The method of claim 6, wherein the physical movement includes a swiping motion of the second device with respect to the first device.

8. The method of claim 1, wherein the second device is configured to identify the time-varying signal strength pattern by comparing the relative signal strength of received data packets with an expected pattern.

9. The method of claim 1, wherein one or more of the second subset of the plurality of data packets includes configuration data usable by the second device to perform a configuration operation.

10. An electronic device having a processor and a memory coupled to the processor, the memory configured to store program instructions executable by the processor to cause the electronic device to:
    configure an impedance matching circuit of a WiFi interface in a first configuration to provide a first amount of signal degradation;
    transmit a first packet via the WiFi interface using the first configuration;
    configure the impedance matching circuit of the WiFi interface in a second configuration to provide a second amount of signal degradation greater than the first amount of signal degradation;
    transmit a second packet via the WiFi interface subsequent to the first packet and using the second configuration;
    configure the impedance matching circuit of the WiFi interface in a third configuration to provide a third amount of signal degradation smaller than the second amount of signal degradation;
    transmit a third packet via the WiFi interface subsequent to the second packet and using the third configuration, wherein a first difference between the first and second amounts of signal degradation and a second difference between the second and third amounts of signal degradation are identifiable by another electronic device in communication with the electronic device during a proximity operation; and
    receive an indication from the other electronic device of whether the first and second differences are proportional to expected differences.

11. The electronic device of claim 10, wherein the electronic device includes a WiFi access point and wherein the other electronic device includes a mobile device.

12. The electronic device of claim 11, wherein the physical movement includes a swiping motion.

13. The electronic device of claim 10, wherein the first and second differences are part of a predetermined pattern configured to emulate a physical movement of the other electronic device with respect to the electronic device.

14. The electronic device of claim 10, wherein the proximity operation includes a pairing operation, a validation operation, or a personalization operation.

15. A non-transitory electronic storage medium having program instructions stored thereon that, upon execution by a processor within an electronic device, cause the electronic device to:
  receive a first subset of a plurality of data packets via a first Radio Frequency (RF) interface having a first range, wherein the plurality of data packets is transmitted as part of a WiFi communication;
  receive a second subset of the plurality of data packets via a second RF interface having a second range shorter than the first range, wherein each data packet of the second subset is transmitted with time-varying signal strength pattern on a per packet basis; and
  transmit an indication, as part of a proximity operation, of whether the time-varying signal strength pattern matches a predetermined pattern.

16. The non-transitory electronic storage medium of claim 15, wherein the time-varying signal strength pattern is configured to simulate a physical movement of the electronic device.

17. The non-transitory electronic storage medium of claim 16, wherein the physical movement includes a simulated swiping motion.

18. The non-transitory electronic storage medium of claim 15, further comprising comparing the relative signal strengths of received data packets with the time-varying signal strength pattern.

19. The non-transitory electronic storage medium of claim 15, wherein the proximity operation includes a pairing operation, a validation operation, or a personalization operation.

* * * * *